Aug. 18, 1959  H. FISCHER  2,900,566
ULTRA-RAPID DISPLACEMENT OF GASES
Filed June 24, 1958  3 Sheets-Sheet 1

INVENTOR.
HEINZ FISCHER
BY
ATTORNEYS

Aug. 18, 1959 — H. FISCHER — 2,900,566
ULTRA-RAPID DISPLACEMENT OF GASES
Filed June 24, 1958 — 3 Sheets-Sheet 2

INVENTOR.
HEINZ FISCHER

Aug. 18, 1959    H. FISCHER    2,900,566
ULTRA-RAPID DISPLACEMENT OF GASES
Filed June 24, 1958    3 Sheets-Sheet 3

INVENTOR.
HEINZ FISCHER
BY
ATTORNEYS

United States Patent Office 2,900,566
Patented Aug. 18, 1959

2,900,566

ULTRA-RAPID DISPLACEMENT OF GASES

Heinz Fischer, Belmont, Mass.

Application June 24, 1958, Serial No. 744,302

2 Claims. (Cl. 315—36)

(Granted under Title 35, U.S. Code (1952), sec. 266)

The invention described herein may be manufactured and used by or for the United States Government for governmental purposes without payment to me of any royalty thereon.

This invention relates to gas displacement, and particularly to the rapid displacement of gases by outward radiation from a central region constituting the focal point where the displacing force is generated.

The invention provides a method of gas displacement involving the concept of generating a gas displacing force by bringing about the ultra-rapid heating of a small volume of gas surrounding a centrally positioned electric capacitance discharge electrode constituting the ultra-high temperature generating agency, and permitting the virtually instantaneously heated gases to expand in radiating fashion from the central position occupied by said electrode, with a correspondingly rapid acceleration of such gases to an extremely high velocity that may reach a magnitude of, for example, 5000 meters/second within an interval of a very few seconds.

In my Patent No. 2,728,877, granted December 27, 1955, there is described a method and apparatus for generating heat pulses of high intensity, suitable for many purposes including, as examples, infra-red signalling, nuclear reaction triggering, material melting, and metal vaporization. As summarized in the specification of the patent, the method comprises building up a direct current charge on a capacitor assembly of toroidal contour, and discharging the capacitor across a pressurized gas gap at the axis of the toroid, the gap being in the center of a chamber whose walls are opaque except for a small insert of lithium fluoride or some equivalently good conductor of optical radiation. The capacitor and associated circuitry are such as to minimize inductance and resistance effects and thus reduce the discharging time by eliminating practically all current flow delaying factors.

While the objective discussed at greatest length in the aforesaid patent is the rapid production of an extremely high temperature, the fact is that the production of intensely brilliant light pulses of ultra-short duration is also inherent in the operation, and references to this fact are set out in the patent specification.

In my co-pending application, Serial No. 724,776, filed March 28, 1958, I have illustrated and described a concentric apparatus for ultra-short light pulse generation in response to capacitor energy discharge, in which apparatus the energy discharge occurs by way of a centrally positioned electrode whose pointed discharge terminal is located at the center of an aperture formed centrally of a metallic plate, causing a "bubble" of ultra-hot gases to expand outwardly from the aperture with rapidly increasing velocity. The present invention provides methods and means for multiplying the velocity generating capabilities of such a gas displacing operation as, for example, by arranging a plurality of capacitor current discharge gaps in series relationship along the axis of the capacitor assembly, thereby compounding the gas accelerating forces and thus producing an ultimate velocity that greatly exceeds the velocity attainable in a single discharge arrangement.

These and other objects and characteristics of the invention will become apparent upon reference to the following description of the invention and the accompanying drawings wherein:

Figure 1 is an axial sectional view of a light pulse generating apparatus of a type illustrated in my co-pending application, Serial No. 724,776, above referred to;

Figure 1:
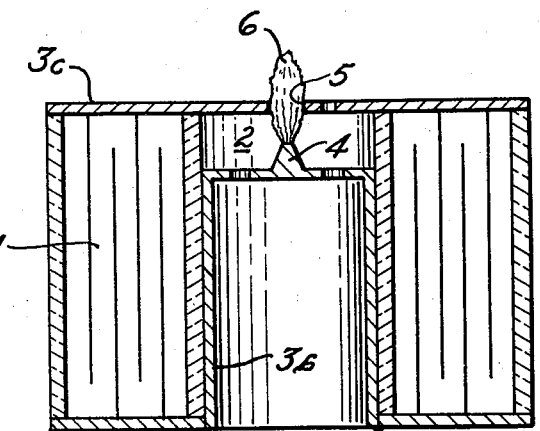

Figure 1 illustrates a simple air "bubble" forming apparatus of a type suggested in my co-pending application, Serial No. 724,776. It consists of a coaxial capacitor 1 which surrounds the discharge chamber 2, as indicated. Thus, the capacitor, the air gap and the electric connections 3a, 3b, and 3c form together a symmetrical coaxial line reducing the inductance of the complete circuit to a minimum. The discharge takes place between the pointed electrode 4 and the center hole 5 in the top plate, producing a bright spark channel between the electrodes which may extend into a radiating "bubble" 6 as indicated. The size and brightness of this bubble depends largely upon parameters such as of the nature of gas, pressure, capacity C, breakdown voltage U, and hole diameter d, as well as thickness of the top plate. The bubble extends out of the hole as much as ½ cm., or more. Change in polarity of the electrodes 4, 5 does not seem to greatly influence the visual appearance of the bubble, however, the amplitude (brightness) of individual shots has been found to be more reproducible in case of a negative top plate (cathode).

Figure 8:
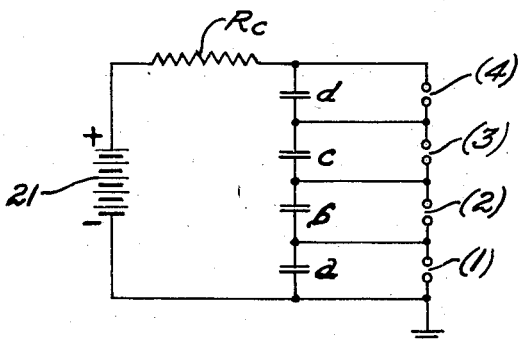
Figure 8 is a diagram illustrating the electrical action in operation of a structure such as is illustrated in Figure 1.

The expansion velocity of the bubble is comparable to the expansion velocity of the current discharge ("spark") itself—that is, it attains maximum value when the light pulse-generating capacitor structure is in co-axial relationship to the light pulse emitting electrode. It has been found that the use of multiple capacitor structures, in series relationship electrically (see Fig. 8) and in nested coaxial relationship to their respective electrodes, as in Figure 2, will produce a gas expansion velocity correspondingly multiplied, as compared with that attainable with the single structure of Figure 1. Another advantage of this multiple coaxial discharge concept lies in the fact that the magnetic fields which influence the expansion of the discharge can be made absolutely symmetrical.

Experimental proof of the invention's feasibility was obtained recently in testing an embodiment having a four-stage open air gap. Average expansion velocities of the bubbles were found to be 2260 m./sec. after the first, 4000 m./sec. after the second, and 4430 at the third stage.

Symbols $a$, $b$, $c$, $d$ (Fig. 2) designate the toroidal capacitors which are connected in series to the individual gaps 1, 2, 3, 4 as indicated. Gap 1 is either triggered by an outside pulse or is made shorter than the other gaps in order to make sure that gap 1 fires first. The following gaps 2, 3, and 4 are wide enough so that the voltage across each individual gap does not reach breakdown potential. Current is supplied from D.C. source 21, by way of resistor $R_c$.

When gap 1 is fired, a high temperature bubble is generated in gap 1, expanding through gap 2. As soon as the bubble traverses gap 2, the breakdown potential of gap 2 is lowered and the gap is fired. Meanwhile the part of the bubble from gap 1 which has already passed gap 2 is being accelerated by the discharge in gap 2. The same effect repeats as soon as the disturbance (bubble) reaches the hole at the end of gap 3.

Figure 3:
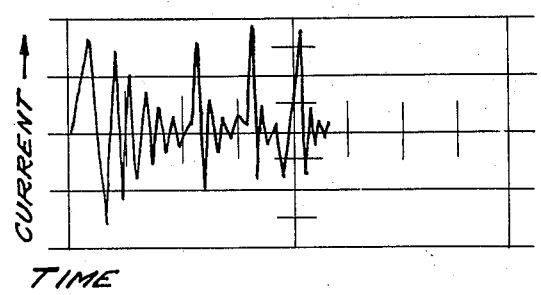
Figure 3 is a graph showing the discharge current pattern over the complete cycle, as measured in microseconds.

Figure 3 shows the time function of the current as picked up by a coupling capacitor from a 4-stage arrangement having a capacity of 0.05 mf., an inductance of 0.004 mh., and gaps of 0.7, 2, 2 and 2 mm. in open air, and a gap 2 mm. in diameter, with total voltage approximately 12 kv., i.e., 3000 volts per stage. The successive breakdowns in gaps 1 to 4 are well recognized from the sudden increase in amplitude which demonstrates the breakdown. The time which is elapsed between the first current maximum and that of the second discharge represents the time for the expanding bubble to travel from gap 1 to gap 2; it measures 0.885 $\mu$sec. in Figure 3 which corresponds to an average expansion velocity of 2,260 m./sec. The mean velocity is 4000 m./sec. for gap 3 and 4,460 m./sec. for gap 4. Thus, it is apparent that the mean expansion velocity is increased by approximately a factor 2 from 2nd to 4th stage, which proves the feasibility of the invention.

Reversing the polarity of the discharge showed that the expansion velocity of the bubble is only increased in such case where the potential increases positive from gap 1 to 4. Reversed polarity, on the other hand, showed an almost almost equal expansion velocity of approximately 1,040 m./sec. in all gaps.

As the gaps are successively triggered by the expanding bubble there is a certain amount of fluctuation or jitter in the breakdown intervals, the jitter increasing from gap 2 to 4; so that the expansion velocities appear different for each breakdown, since the velocity is calculated from the time interval between two following breakdowns. It is probable that the jitter is attributable to a number of causes. In any event, taking into account the maximum effect due to jitter, there is definitely an increase in expansion velocity from gap 2 to 4, the degree of increase being as indicated heretofore.

The jitter can be reduced by triggering the individual gaps by means of an outside trigger pulse, properly timed. Such trigger techniques are well known and readily applicable.

Velocities as high as 5000 m./sec. have been obtained by operating a four-stage apparatus at a pressure of one atmosphere, increasing the velocity by approximately a factor of two. These tests utilized a breakdown voltage per stage of only 3,000 volts and a capacity that was only 0.05 microfarad. Thus considerable increase of velocity is to be expected by increasing "U" and "C."

The expansion velocity of the bubble, on the other hand, decreases with increasing distance from the hole as was measured by means of a photoelectric method; this means that larger velocity may be obtained when the individual length of the gaps is reduced. Largest velocity will be observed in hydrogen, second largest in helium. The hydrogen velocities are ordinarily at least twice those of air.

In the apparatus thus far tested the bubble in the last stage was approximately 1.5 cm. long. Considerable increase in size is possible in case of larger values of "U" and "C," and reduced gas pressure $p$.

The bubble-temperatures may range anywhere between approximately 5000 up to over 100,000 degrees Kelvin, depending upon the electric data of the coaxial discharge.

Figure 4:
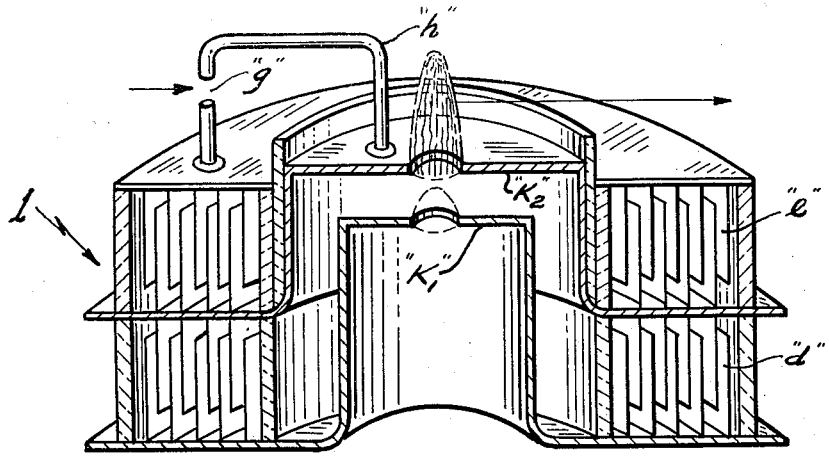
Figures 4 and 5 show alternative embodiments of the invention in which the behavior of the expanding gases is influenced by magnetic fields that are established by the magnetizing effect of the bubble producing current; the Figure 5 construction including also a bubble "pinching" feature for further control of the gas expansion.

The bubble responds to a magnetic field and may be confined ("pinched") or accelerated by a properly timed pulsed magnetic field. This pulsed magnetic field may be provided by an outside source or being produced by the same current which forms the bubble. A suitable magnetic field for acceleration, for example, is produced when the return lead into the capacitor consists of a narrow wire or flat metallic sheet parallel to the axis of the bubble as indicated in Figure 4, wherein $d$ is the last bubble-forming capacitor of the multi-stage arrangement; $e$ is an additional capacitor with a triggered gap $g$ and the return lead $h$ which provides the magnetic pulse; the gap is fired at a proper time when the bubble has formed. With the geometry as applied in Figure 4, the bubble will be accelerated at right angle to the return lead.

Figure 5:
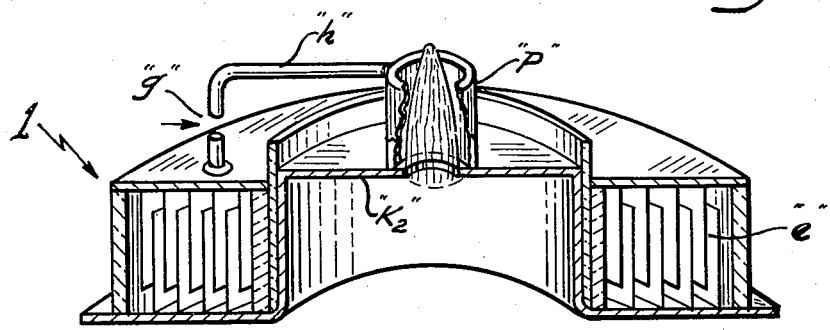

An arrangement for an external concentric magnetic field which has the purpose of "pinching" the bubble is shown in Figure 5, wherein capacitor $e$ (corresponding to capacitor $e$ of Figure 4) includes not only the bubble-forming plate $K_2$ of the Figure 4 arrangement, but also a confining cylinder P serving as the pinching element.

Figure 2:
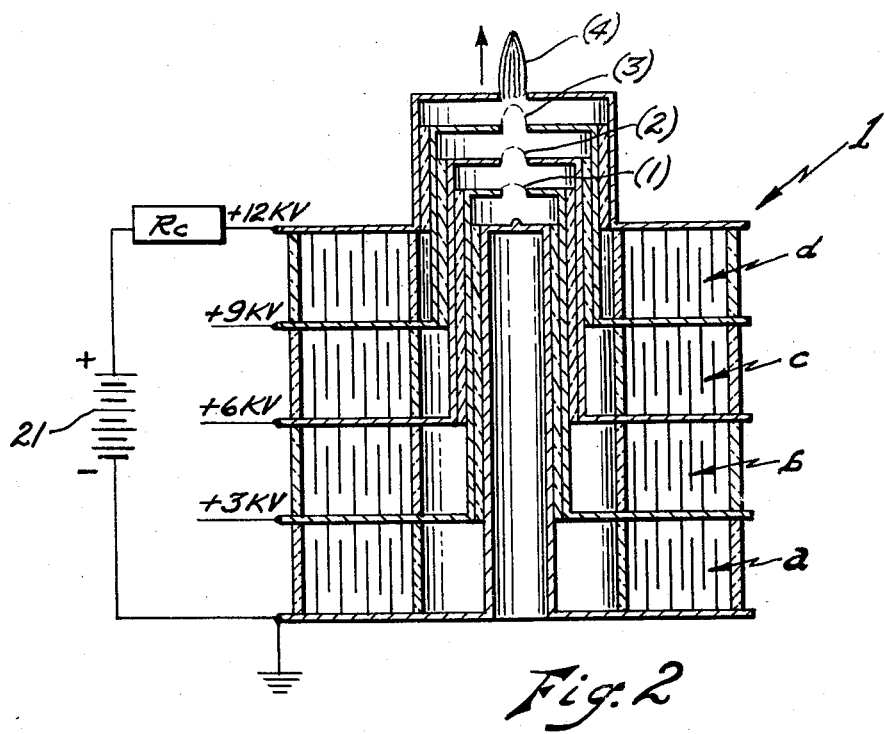
Figure 2 is an axial sectional view of an apparatus embodying the present invention, which apparatus utilizes a plurality of components of the type illustrated in Figure 1, said components being arranged and controlled, physically and electrically, in a manner to achieve the purposes of the invention.
Figure 6:
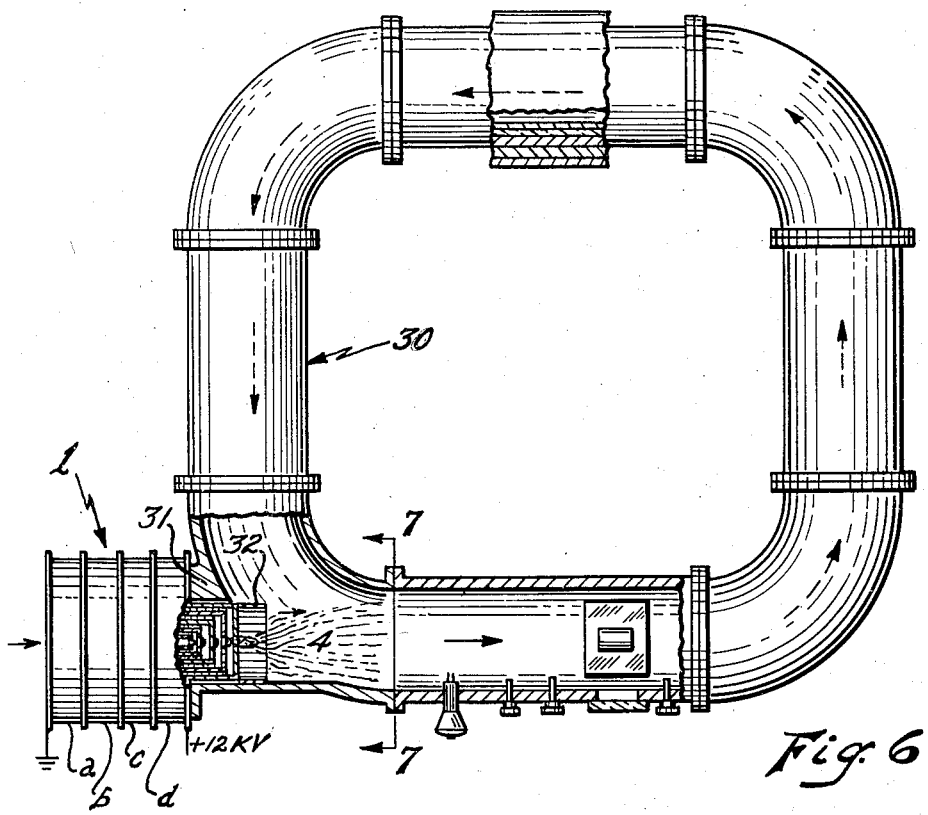
Figure 6 shows the invention in association with a fluid conduit of the "wind-tunnel" category, to illustrate one practical application thereof.
Figure 7:
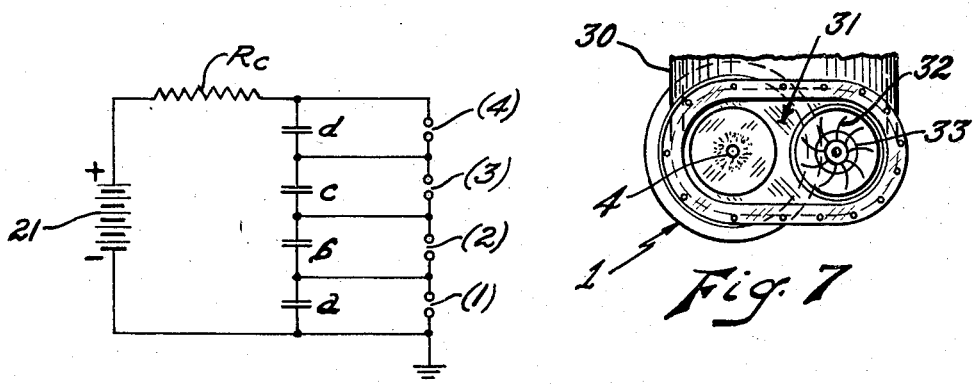
Figure 7 is a sectional view along line 7—7 of Figure 6.

Figures 6 and 7 show the invention applied to one of the many possible uses, namely, to a "wind tunnel" 30 of conventional design, except for modification of the tunnel design to incorporate a housing 31 for support of a capacitor structure of the character shown, for example, in Figure 2, and also serving to house a centrifugal blower 32 driven by a motor 33, the said blower 32 acting to receive the gases expanding radially and peripherally from the final stage capacitor bubble 4, and to deliver these gases to the main flow path constituted by the closed loop 30. Objects to be tested in tunnel 30 may be inserted and observed through conventional fittings (not shown).

While the foregoing description refers to the successive discharge gaps as functioning in successive time intervals, it should also be noted that the time interval may reduce to zero, thereby resulting in simultaneous discharge of all gaps, under strongly reduced pressure conditions. Thus, for example, in an experiment utilizing argon in a chamber whose pressure had been reduced to approximately 10 millimeters of mercury, and a capacitor assembly having six gaps, it was observed that all six gaps fired practically simultaneously, that is, the delay between the firing of the first gap and the firing of the other gaps was shorter than $10^{-7}$ seconds. This phenomenon is caused mainly by the fact that, at such reduced pressure, the short wave radiation of the first discharge has a virtually instantaneous triggering effect upon the other gaps, whereas in the more commonly prevailing pressure ranges, such short wave radiation is absorbed before reaching the other gaps.

What is claimed is:

1. A series of high-energy capacitors aligned along a common longitudinal axis, said capacitors having nested, centrally apertured terminal plates, and means including progressively larger central apertures in said terminal plates for causing an ionized gas bubble to form and expand along said longitudinal axis.

2. Apparatus including a toroidal capacitor, a terminal plate having a discharge aperture enclosed by said toroidal capacitor, and means for causing an unconfined gas to expand radially from said aperture in response to capacitor discharge.

References Cited in the file of this patent

UNITED STATES PATENTS 2,145,727    Lloyd _____ Jan. 31, 1939